United States Patent [19]

Goon et al.

[11] 4,316,625
[45] Feb. 23, 1982

[54] VEHICULAR SALT DISPENSER

[76] Inventors: Harry Goon, c/o George Spector, 3615 Woolworth Bldg., 233 Broadway; George Spector, 3615 Woolworth Bldg., 233 Broadway, both of New York, N.Y. 10007

[21] Appl. No.: 117,660

[22] Filed: Feb. 1, 1980

[51] Int. Cl.³ .......................... B61C 15/10; B05B 7/24
[52] U.S. Cl. .......................... 291/1; 222/368; 222/626; 239/314; 291/3; 291/32; 291/38; 291/41
[58] Field of Search .................. 291/1, 2, 3, 32, 38, 291/41; 239/172, 310, 314, 426; 222/368, 626

[56] References Cited

U.S. PATENT DOCUMENTS

| | | | |
|---|---|---|---|
| 752,598 | 2/1904 | Schwend | 291/3 |
| 2,221,777 | 11/1940 | Chapman | 291/32 X |
| 2,282,185 | 5/1942 | Havill | 291/3 |
| 2,672,361 | 3/1954 | Werbe | 291/3 |
| 2,793,791 | 5/1957 | Clark | 222/368 X |
| 2,863,590 | 12/1958 | Giesse | 222/368 X |
| 3,271,061 | 9/1966 | Miller | 291/38 X |
| 3,827,736 | 8/1974 | Mango | 291/32 X |
| 4,140,349 | 2/1979 | Behnken | 222/626 X |

*Primary Examiner*—Robert J. Spar
*Assistant Examiner*—Fred A. Silverberg

[57] ABSTRACT

A salt dispensing accessory mountable on an automotive vehicle so to dispense salt in front of the rear wheels thereof for traction on ice; the device including a salt storage container with a downward spout underneath, and also a unit for moistening the dispensed salt, the unit including a water storage vessel, a tube from the vessel being intercepted by a motor-driven water pump, and an outlet of the line being constructed to form an atomizer and being directed transversely across the falling salt.

1 Claim, 4 Drawing Figures

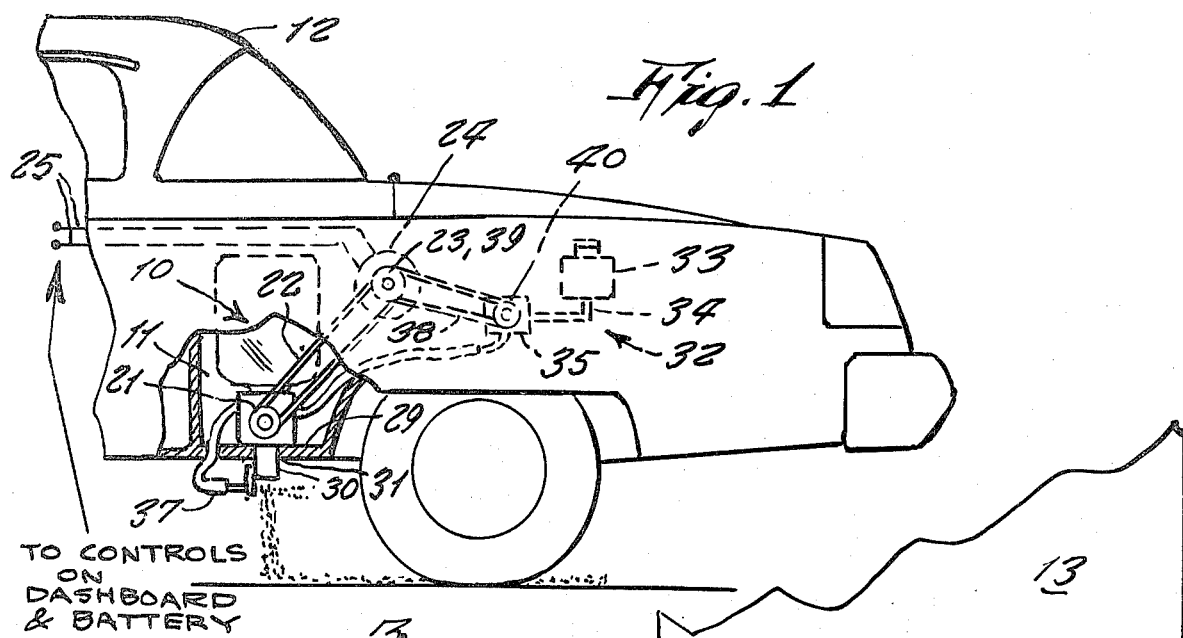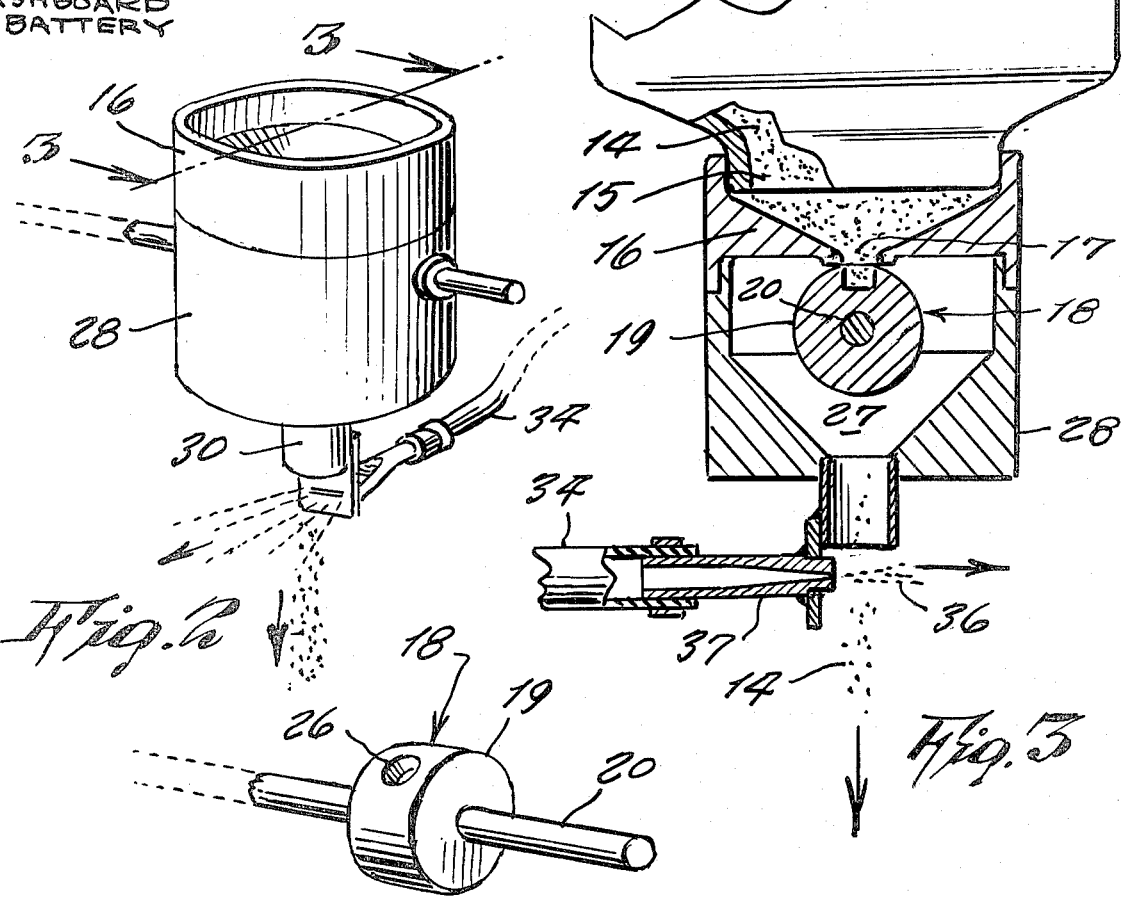

VEHICULAR SALT DISPENSER

This invention relates generally to automotive accessories,

It is well known that automotive vehicles are subject to very easily skid on icy road surfaces and result in possible collision with other objects with the danger of damage to the vehicle and harm to the persons herein and nearby. While tire chains or studded snow tires aid in preventing such skids, most vehicles are not provided therewith and accordingly, depend on streets and highways being salted, when icy, by highway maintenance departments of local municipalities, which unfortunately are often not out working before the automotive traffic is traveling on the ice, so that this situation is therefore in need of an improvement.

Accordingly, it is a principal object of the present invention to provide an accessory mountable on an automotive vehicle and which dispenses salt in front of the wheels so as to give traction thereto when traveling across an icy or other skiddy surface.

Another object is to provide a vehicular salt dispenser which moistens the salt while being dispensed, so that it better adheres to an icy surface and thus improves the traction, instead being swept away by a spinning wheel.

Still a further object is to provide a vehicular salt dispenser which is controlled from the dashboard of the vehicle so that a driver can activate the same instantly if the vehicle encounters an icy patch on the road surface during its travel, and which thereafter can be deactivated also from the dashboard by the motorist, so to conserve on the sand.

FIG. 1 is a view of the invention installed in a trunk compartment of a car, and showing the device including a moistening device so that the moistened salt or sand better holds to an icy surface for improved traction.

FIG. 2 is an enlarged perspective view of the dispenser.

FIG. 3 is a cross sectional view on line 3—3 of FIG. 2

FIG. 4 is a perspective view of the carrier axle.

Referring now to the drawing in greater detail, the reference numeral 10 represents a vehicular salt dispenser according to the present invention, and which is installed inside a truck compartment 11 of a passenger automobile 12, or which on trucks may be mounted underneath. The dispenser includes an inverted container 13 filled with dry salt 14 so as to empty from the container opening 15 and into a hopper 16 having outlet 17 at its bottom. A dispensing regulator 18 under the outlet serves to close the outlet when not needed, and dispenser the salt in a controlled amount when needed. It comprises a roller 19 affixed on a shaft 20 journalled in stationary bearings. A pulley 21 affixed on the shaft is rotated by an endless belt 22 passed also around a pulley 23 on a motor shaft of an electric motor 24. Conductors 25 from the motor extend to the vehicle battery and dashboard where a control switch can be turned on or off by a motorist, as wished. The roller 19 has an indentation 26 on its surface, which during rotation, aligns with the outlet 17 so as to momentarily fill with the salt dispensing from the hopper. As the roller rotates the salt then drops out of the indentation and inside of a chamber 27 of a base 28 upon which the hopper is supported. The base is mounted on a floor 29 of the trunk compartment, and a spout 30 from a bottom of the chamber, protrudes downwardly through a hole 31 drilled through the floor so that the spout extends outside of the vehicle and in front of a rear wheel of the vehicle.

In the present invention, two such dispensers 10 are located in the vehicle and are positioned so the spout from each is in front of the rear wheel. The shaft 20 extends between the two dispensers so that only a single motor and pulley drive unit is needed to operate the both dispensers. In an alternate design each dispenser may be made with its own motor and pulley drive unit so that a motorist can apply salt selectively to only either one of the wheels, as wished.

The present invention also includes a salt moistening unit 32, also in the trunk compartment, for each dispenser 10, the unit including a water container 33 with removable cover. A water line 34 from the container to both dispensers, is intercepted by a water pump 35 for pumping water 36 from the container to a spray nozzle 37 secured to the spout so that water sprays horizontally under the spout and thus moisten the grains of salt as they fall vertically through the spray. The pump is driven by an endless belt 38 and pulleys 39 and 40 powered by the motor 24.

The present invention may be designed for are on buses and trucks as well as passenger cars and for front wheels thereof as well as rear wheels.

What is claimed as new, is:

1. A traction increasing vehicular salt dispenser, comprising in combination, a salt dispensing unit for each rear wheel; a drive unit for said dispensing units; each said dispensing unit comprising a container containing said salt; said container being mounted in front of the rear wheel; a hopper with a first outlet mounted under said container and a rotatable dispensing regulator mounted under said first outlet of said hopper; said drive unit includes an electric motor controlled from a dashboard of a vehicle; a shaft connecting the dispensing regulators; a first pulley affixed on said shaft, an endless belt secured around said first pulley and around a second pulley, wherein said second pulley is affixed to a motor shaft of the electric motor; said regulator, which opens and closes said first outlet, including means for receiving salt from said first outlet and dispensing it at regular intervals towards a second outlet; wherein said regulator is a wheel and said means is a recess at its periphery which aligns at regular intervals with said first outlet; a hollow base enclosing said regulator and including said second outlet which is mounted downstream of the first outlet; a spout being connected to said second outlet; a water container; a water pump connected to the water container to pump water to both the dispensers; said pump being driven by an endless belt secured around a third pulley connected to the motor shaft and a fourth pulley mounted on the pump; and a spray nozzle mounted below and secured to the spout so that water is sprayed horizontally under the spout toward the rear wheels to moisten the salt as the salt falls from the spout.

* * * * *